(12) United States Patent
Azam et al.

(10) Patent No.: US 12,081,040 B2
(45) Date of Patent: Sep. 3, 2024

(54) RECEIVERS AND TRANSMITTERS FOR WIRELESS CHARGING OF DEVICES IN MOTION

(71) Applicant: Hewlett-Packard Development Company, L.P., Spring, TX (US)

(72) Inventors: Syed S. Azam, Spring, TX (US); Gregg Tyler Sims, Corvallis, OR (US); Dimitre D. Mehandjiysky, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 255 days.

(21) Appl. No.: 17/286,585

(22) PCT Filed: Dec. 12, 2018

(86) PCT No.: PCT/US2018/065285
§ 371 (c)(1),
(2) Date: Apr. 19, 2021

(87) PCT Pub. No.: WO2020/122907
PCT Pub. Date: Jun. 18, 2020

(65) Prior Publication Data
US 2021/0391756 A1  Dec. 16, 2021

(51) Int. Cl.
*H02J 50/40* (2016.01)
*G02B 26/08* (2006.01)
*H02J 50/90* (2016.01)

(52) U.S. Cl.
CPC .......... *H02J 50/40* (2016.02); *G02B 26/0833* (2013.01); *H02J 50/90* (2016.02); *H02J 2310/22* (2020.01)

(58) Field of Classification Search
CPC ....................................................... H02J 50/20
(Continued)

(56) References Cited

U.S. PATENT DOCUMENTS 7,423,767 B2   9/2008   Steinsiek et al.
9,941,747 B2   4/2018   Bell et al.
(Continued)

FOREIGN PATENT DOCUMENTS

CN       108832728 A      11/2018
WO   WO-2017015519 A1      1/2017

OTHER PUBLICATIONS

Simon Hill, "When Will Your Phone Charge Wirelessly in Your Pocket? We Asked an Expert", Emerging Tech, Digital Trends, Apr. 28, 2018, 20 pgs.

*Primary Examiner* — Edward Tso
*Assistant Examiner* — Ahmed H Omar
(74) *Attorney, Agent, or Firm* — Quarles & Brady LLP

(57) ABSTRACT

An example receiver device to be wirelessly charged in motion includes a power receiver to receive a power beam to charge a power supply and a modulating reflector. The modulating reflector is to reflect a portion of the power beam as a reflected signal, modulate the reflected signal, and vary a direction of the reflected signal to scan an area for an example power beam transmitter device. The power beam transmitter device is to track motion of the receiver device based on modulation of the reflected signal and to cooperate with other power beam transmitter devices to prioritize distribution of power among a plurality of receiver devices. An example system for wireless charging of devices in motion includes a plurality of power beam transmitter devices to coordinate transmission of power beams to a receiver device based on the motion of the receiver device.

14 Claims, 12 Drawing Sheets

(58) Field of Classification Search
USPC .......................................................... 320/108
See application file for complete search history.

(56) References Cited

U.S. PATENT DOCUMENTS

| | | | |
|---|---|---|---|
| 10,008,875 B1 | 6/2018 | Leabman | |
| 2005/0190427 A1 | 9/2005 | Steinsiek et al. | |
| 2006/0266917 A1 | 11/2006 | Baldis et al. | |
| 2010/0078995 A1* | 4/2010 | Hyde | H02J 50/40 |
| | | | 307/11 |
| 2014/0175893 A1* | 6/2014 | Sengupta | H01Q 21/225 |
| | | | 307/104 |
| 2014/0292090 A1 | 10/2014 | Cordeiro et al. | |
| 2015/0333800 A1* | 11/2015 | Perry | H02J 50/15 |
| | | | 320/108 |
| 2017/0005520 A1 | 1/2017 | Zeine et al. | |
| 2017/0069973 A1* | 3/2017 | Black | H01Q 21/061 |
| 2017/0085112 A1 | 3/2017 | Leabman | |
| 2017/0288475 A1* | 10/2017 | Lee | H02J 7/00034 |
| 2017/0288739 A1 | 10/2017 | Shin et al. | |
| 2018/0323657 A1 | 11/2018 | Hannigan et al. | |
| 2019/0356177 A1* | 11/2019 | Swan | H02J 50/80 |

* cited by examiner

RECEIVERS AND TRANSMITTERS FOR WIRELESS CHARGING OF DEVICES IN MOTION

BACKGROUND

Mobile devices may be wirelessly charged by near-field charging techniques or far-field charging techniques. Near-field charging techniques involve the transfer of power over short distances, typically using magnetic or electric fields. Near-field charging has been incorporated into consumer products such as charging pads to charge mobile devices. Far-field charging techniques, also known as power-beaming, involve the transfer of power over longer distances, using electromagnetic, acoustic, or other forms of energy.

DETAILED DESCRIPTION

This specification concerns power transmission, and in particular the transmission of power over a distance to wirelessly charge a device. Power may be transmitted over a distance to wirelessly charge a device via a power beam, such as an infrared light power beam, an electromagnetic power beam, or acoustic power beam, or a plurality of such, which may be harnessed by a suitable power receiver at a receiving device.

A power beam need not conform to any communication protocol or contain any useful information, in contrast to a communication signal that does include information and may provide a very small or negligible amount of power. A power beam may be generated as generally capable of providing a greater amount of power than a communication signal and without information.

A receiver device may be wirelessly charged from a long distance by a power beam transmitter device. The power beam transmitter device may aim and transmit a narrow power beam toward the receiver device. Charging of the receiver device may be limited, however, by the receiver device being moved outside the scope of the power beam. Thus, a user of the receiver device may not be able to freely move about an area without disrupting the wireless charging of the receiver device.

The receiver device may be charged continuously while in motion if its motion is tracked and if a power beam transmitter device is able to follow the receiver device with a power beam. The receiver device may facilitate a power beam transmitter device tracking its motion by reflecting a portion of a power beam back to the power beam transmitter device as a reflected signal. The power beam transmitter device may use the reflected signal in an angle-of-arrival calculation, a time-of-flight calculation, or for the generation of a signal map, to track motion of the receiver device. A group of power beam transmitter devices may coordinate transmission of power beams to the receiver device based on the motion of the receiver device and thereby cooperate to prioritize distribution of power among a plurality of receiver devices. Thus, a receiver device may convert a power beam which contains no information into a reflected signal which provides information about the receiver device's location to a power beam transmitter device. This information may be used to coordinate transmission of power to the receiver device.

Figure 1:
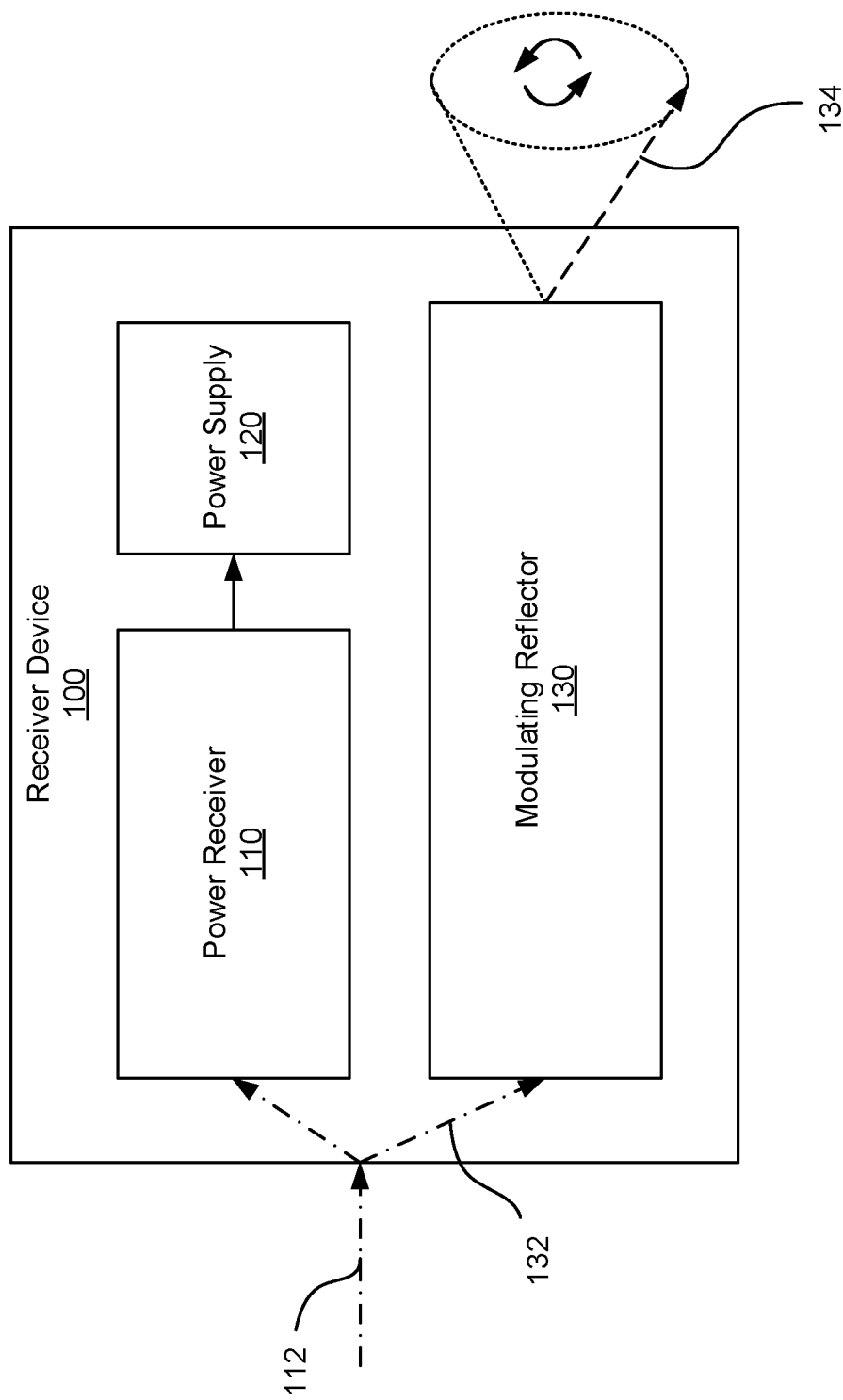
FIG. 1 is a schematic diagram of an example receiver device to be wirelessly charged in motion.

FIG. 1 is a schematic diagram of such an example receiver device 100. The receiver device 100 includes a power receiver 110 to receive a power beam 112 to charge a power supply 120. The receiver device 100 further includes a modulating reflector 130 to reflect a portion 132 of the power beam 112 as a reflected signal 134. The modulating reflector 130 modulates the reflected signal 134. The modulating reflector 130 may modulate the reflected signal 134 by constructive and/or destructive interference.

The modulating reflector 130 also varies a direction of the reflected signal 134 to scan an area for a power beam transmitter device which is to track motion of the receiver device 100 based on modulation of the reflected signal 134. In other words, the modulating reflector 130 may sweep an area with a reflected signal 134 for power beam transmitter devices at which the reflected signal 134 may be received. The power beam transmitter device is further to cooperate with other power beam transmitter devices to prioritize distribution of power among a plurality of receiver devices.

The distribution of power may be prioritized based on the location of the receiver devices. For example, power beam transmitter devices may be assigned to charge a receiver device which receives the greatest magnitude of power from the power beam transmitter device. The distribution of power may be prioritized based on motion of the receiver devices through an area including a plurality of power beam transmitter devices. For example, the receiver device may be charged by different power beam transmitter devices as the receiver device moves from one location to the next. The distribution of power may be prioritized based on the power levels of a plurality of receiver devices. For example, receiver devices having the lowest power levels may be prioritized to be charged first, or by the power beam transmitter device which is capable of transmitting the greatest power to the receiver device. Further, the distribution may be prioritized based on any combination of prioritization schemes.

Further, the prioritization logic may be configurable. For example, the prioritization logic may be configured such that receiver devices having a power level lower than 20% are considered "high" priority, whereas under other configurations, receiver devices having a power level lower than 30% are considered "high" priority.

Further, the prioritization logic may be generated via machine learning to intelligently coordinate the charging of receiver devices by power beam transmitters. For example, the coordination of the charging of receiver devices may be determined via a machine learning model trained to match power beam transmitters to receiver devices. The machine learning model may match power beam transmitters to receiver devices based on a predefined goal, such as, for example, providing the greatest charging capability to the receiver devices in an area based on the locations and movement of the receiver devices within the area.

A power beam transmitter device may track motion of the receiver device 100 using various techniques. For example, the modulating reflector 130 may reflect the reflected signal 134 to a power beam transmitter device for use in an angle-of-arrival calculation to track motion of the receiver device 100. The modulating reflector 130 may also reflect the reflected signal 134 to a power beam transmitter device for use in a time-of-flight calculation to track motion of the receiver device 100.

The receiver device 100 may transmit to the power beam transmitter device a status of the receiver device 100 to determine a priority of the receiver device 100 to be charged in relation to other devices. For example, the receiver device 100 may transmit an indication of a power level, such as a battery level, of the power supply 120. In such examples, the power beam transmitter device may cooperate with other power beam transmitter devices to prioritize distribution of power among the plurality of receiver devices based on the power level of the receiver device and other power levels of the other receiver devices of the plurality of receiver devices. A lower battery level may correspond to a higher priority to be charged. The receiver device 100 may transmit the status to the power beam transmitter via the modulating reflector 130, whereby modulation of the reflected signal 134 may indicate the status, or via another communication device, such as an antenna, which broadcasts the status to power beam transmitter devices.

The reflected signal 134 may have a magnitude to indicate to the power beam transmitter device a magnitude of power received by the receiver device 100 from the power beam, and the power beam transmitter device may cooperate with other power beam transmitter devices to prioritize distribution of power among the plurality of receiver devices based on the magnitude of power received by the receiver device and other magnitudes of power received by other receiver devices of the plurality of receiver devices. Thus, the power beam transmitter device may receive an indication of how powerful the power beam is at charging the receiver device 100. The power beam may be more powerful when the receiver device 100 is close to the power beam transmitter device and/or is in its line of sight, and less powerful when the receiver device 100 is farther from the power beam transmitter device and/or when line of sight is obstructed. The power beam transmitter device may use the magnitude to determine whether it should transmit the power beam to charge the receiver device 100, shut off the power beam due to low efficiency of power transfer, or redirect the power beam to another device which may receive power more efficiently.

The modulating reflector 130 may include a micro electro-mechanical system (MEMS) to vary the direction of the reflected signal 134. The MEMS may include a micro-reflector to modulate and reflect the reflected signal 134, and a micro-actuator to vary a direction of the reflected signal 134.

Figure 2:
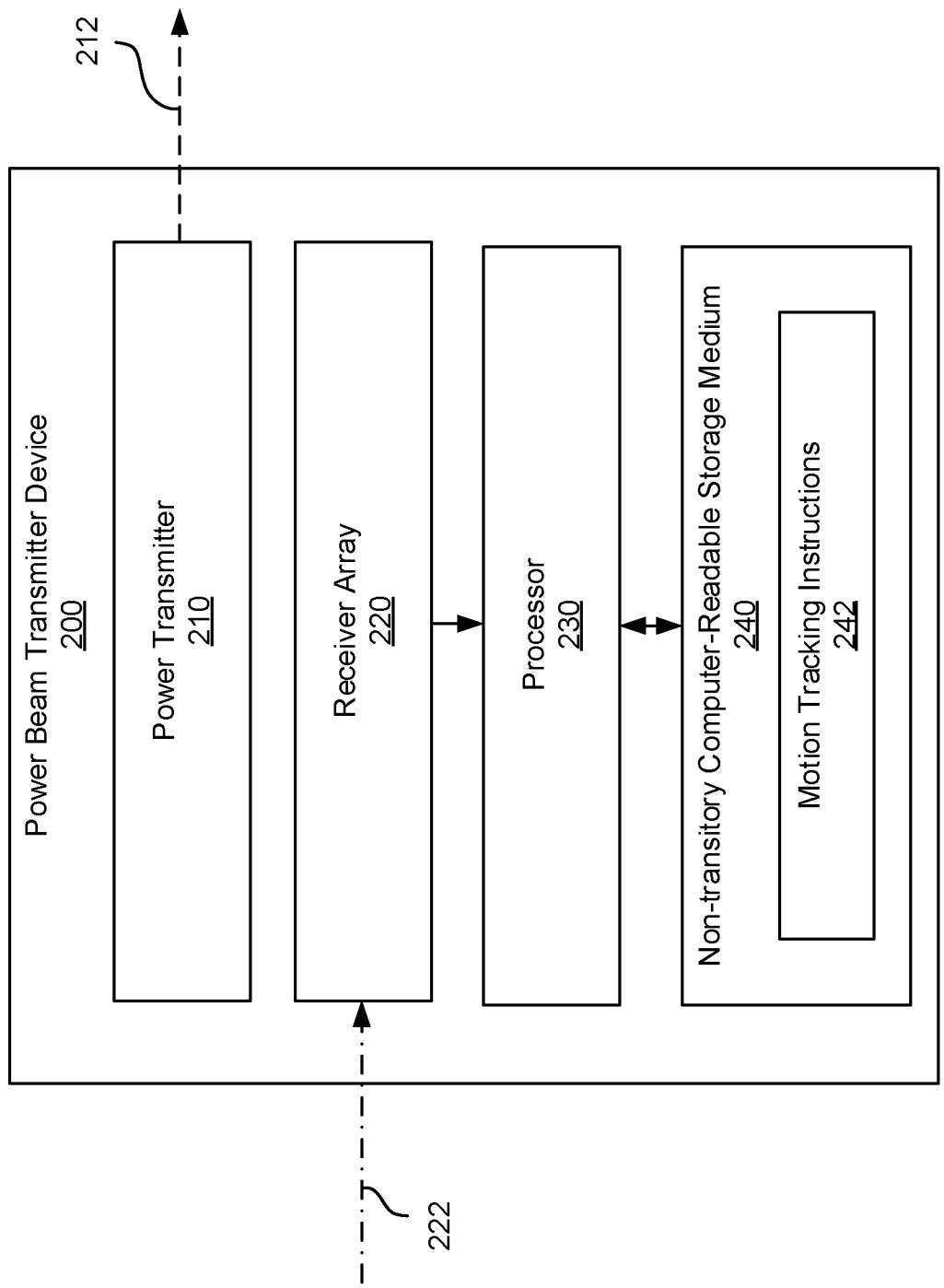
FIG. 2 is a schematic diagram of an example power beam transmitter device to wirelessly charge a receiver device in motion.

FIG. 2 is a schematic diagram of an example power beam transmitter device 200 to wirelessly charge a receiver device in motion. The power beam transmitter device 200 includes a power transmitter 210 to transmit a power beam 212 and a receiver array 220 to receive a reflected signal 222 from a power beam receiver device. The power beam transmitter device 200 further includes a processor 230 connected to the receiver array 220 to determine a modulation of the reflected signal 222, to track motion of the power beam receiver device based on the modulation of the reflected signal 222, and to cooperate with other power beam transmitter devices to prioritize distribution of power among a plurality of receiver devices. Thus, the power beam transmitter device 200 includes a non-transitory computer-readable storage medium 240 including motion tracking instructions 242 to cause the processor 230 to track motion of the power beam receiver device based on the modulation of the reflected signal 222 and to cooperate with other power beam transmitter devices to prioritize distribution of power among a plurality of receiver devices. Prioritization of power distribution may be based on any prioritization scheme or combination of prioritization schemes described with respect to the power beam transmitter device described in FIG. 1.

Figure 3:
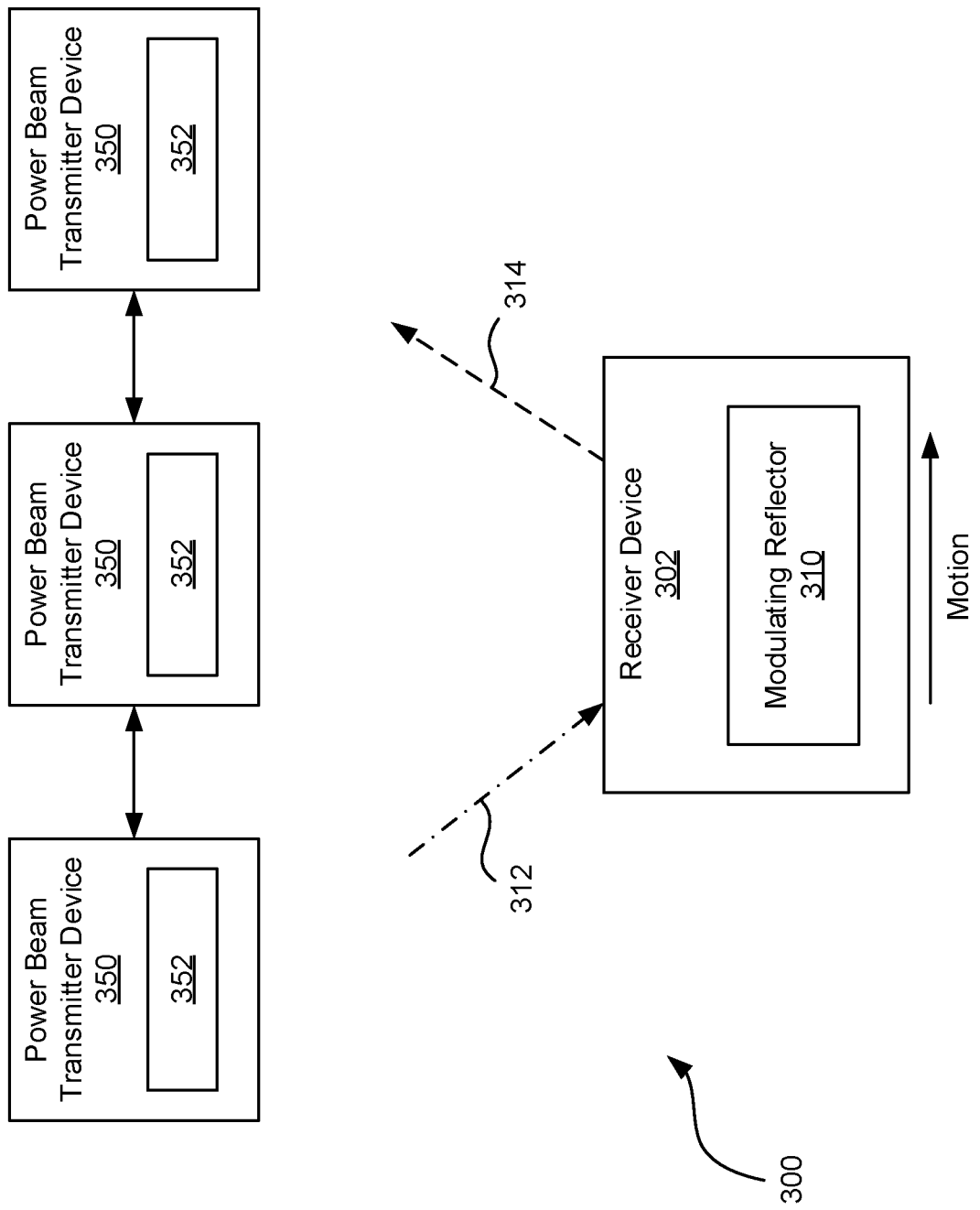
FIG. 3 is a schematic diagram of a system for wireless charging of devices in motion.

FIG. 3 is a schematic diagram of a system 300 for wireless charging of devices in motion. The system 300 includes a plurality of power beam transmitter devices 350. A power beam transmitter device 350 may be similar to the power beam transmitter device 200 of FIG. 2, and thus, may include a power transmitter, a receiver array, a processor, a non-transitory computer-readable storage medium, and motion tracking instructions. For further description of a power beam transmitter device 350, description of the power beam transmitter device 200 of FIG. 2 may be referenced.

The system 300 further includes a receiver device 302. The receiver device 302 may be similar to the receiver device 100 of FIG. 1, and thus, may include a power receiver, a power supply, and a modulating reflector. For further description of the above elements, description of the receiver device 100 of FIG. 1 may be referenced. The receiver device 302 includes a modulating reflector 310 to reflect a portion of a power beam 312 as a reflected signal 314 to a receiving power beam transmitter device 350 of the plurality of power beam transmitter devices.

The plurality of power beam transmitter devices 350 is to track motion of the receiver device 100 based on modulation of the reflected signal 314. Further, the plurality of power beam transmitter devices 350 is to coordinate transmission of power beams to the receiver device 100 and to prioritize charging of the receiver device among a plurality of receiver devices. Prioritization of power distribution may be based on any prioritization scheme or combination of prioritization schemes described with respect to the power beam transmitter device described in FIG. 1. Thus, the power beam transmitter devices 350 include transmission coordination instructions 352. The power beam transmitter devices 350 may communicate via a mesh network or other computing network.

The reflected signal 314 may have a magnitude to indicate to the receiving power beam transmitter device 350 a magnitude of power received by the receiver device 100 from the power beam 312. Further, the modulating reflector 310 may sweep an area with a reflected signal 314 for power beam transmitter devices 350 at which the reflected signal 314 may be received. Thus, the plurality of power beam transmitter devices 350 may coordinate transmission of power beams to the receiver device 302 further based on the magnitude of power received from the power beam 312, and the power beam transmitter devices 350 may coordinate to determine which power beam transmitter device 350 is most appropriate to transmit a power beam to the receiver device 100 based on which power beam transmitter device 350 is able to transmit the greatest amount of power to the receiver device 302. When a power beam transmitter 350 determines it is delivering power to the most appropriate receiver device 302, the power beam transmitter 350 may continue to deliver power to the receiver device 302. Other power beam transmitters 350 which may transmit a power beam 312 to the receiver device 302 to test how much power may be delivered to the receiver device 302, and receive reflected signals 314 indicating the amount of power being delivered. The power beam transmitter devices 350 may determine that, based on motion of the receiver device 302, the receiver device 302 may be powered more effectively by a different power beam transmitter device 350, and thus may cause a switch wherein the different power beam transmitter device 350 begins to power the receiver device 302.

The power beam transmitter devices 350 may further coordinate transmission of power beams to receiver devices based on maintaining power density in an area below a threshold. Legal, safety, or other regulations may prohibit raising the power density of an area beyond a pre-defined safety threshold. The power beam transmitter devices 350 may coordinate which power beam transmitter devices 350 to charge a receiver device 302 while maintaining a power density in the area which does not overcome such a threshold. Maintaining a low power density in the area may involve switching which power beam transmitter device 350 charges the receiver device 302.

Further, the receiver device 302 may include a multimodal power receiver, and different power beam transmitter devices 350 may transmit different types of power beams to the receiver device 302 to charge the receiver device 302 with different forms of energy. Power beam transmitter devices 350 may thereby control power density by transmitting different types of power beams such that no single type of power density exceeds any pre-determined safety threshold.

Figure 4:
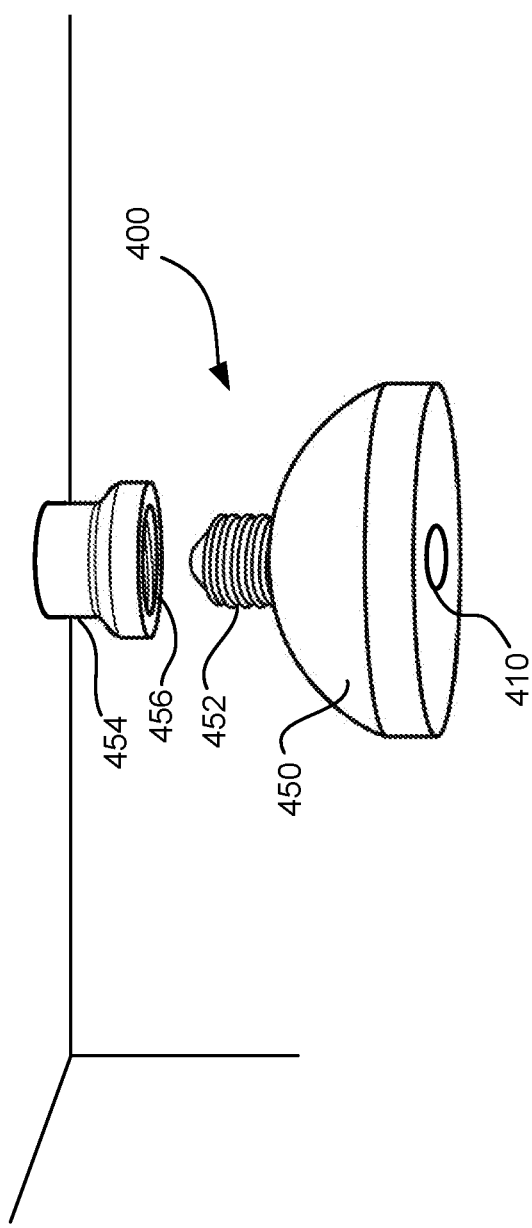
FIG. 4 is a schematic diagram of an example power beam transmitter device mountable to a surface.

FIG. 4 is a schematic diagram of an example power beam transmitter device 400. The power beam transmitter device 400 may be similar to the power beam transmitter device 200 of FIG. 2, and thus, may include a power transmitter, a receiver array, a processor, a non-transitory computer-readable storage medium, and motion tracking instructions. For further description of the above elements, description of the power beam transmitter device 200 of FIG. 2 may be referenced. However, the power beam transmitter device 400 is mountable to a surface.

The power beam transmitter device 400 may include a housing 450 which houses a power transmitter 410 to transmit a power beam to a receiver device. The power beam transmitter device 400 may further include a mounting connector by which the housing 450 may be connected to a fixture which is mounted on a surface. For example, the fixture may include a ceiling fixture 454 having a threaded socket 456, and the mounting connector may include screw threads 452 which may be mated with the threaded socket 456. Thus, the power beam transmitter device 400 may be mounted to the ceiling. In other examples, the power beam transmitted device 400 may be mountable to other surfaces such as walls.

Figure 5:
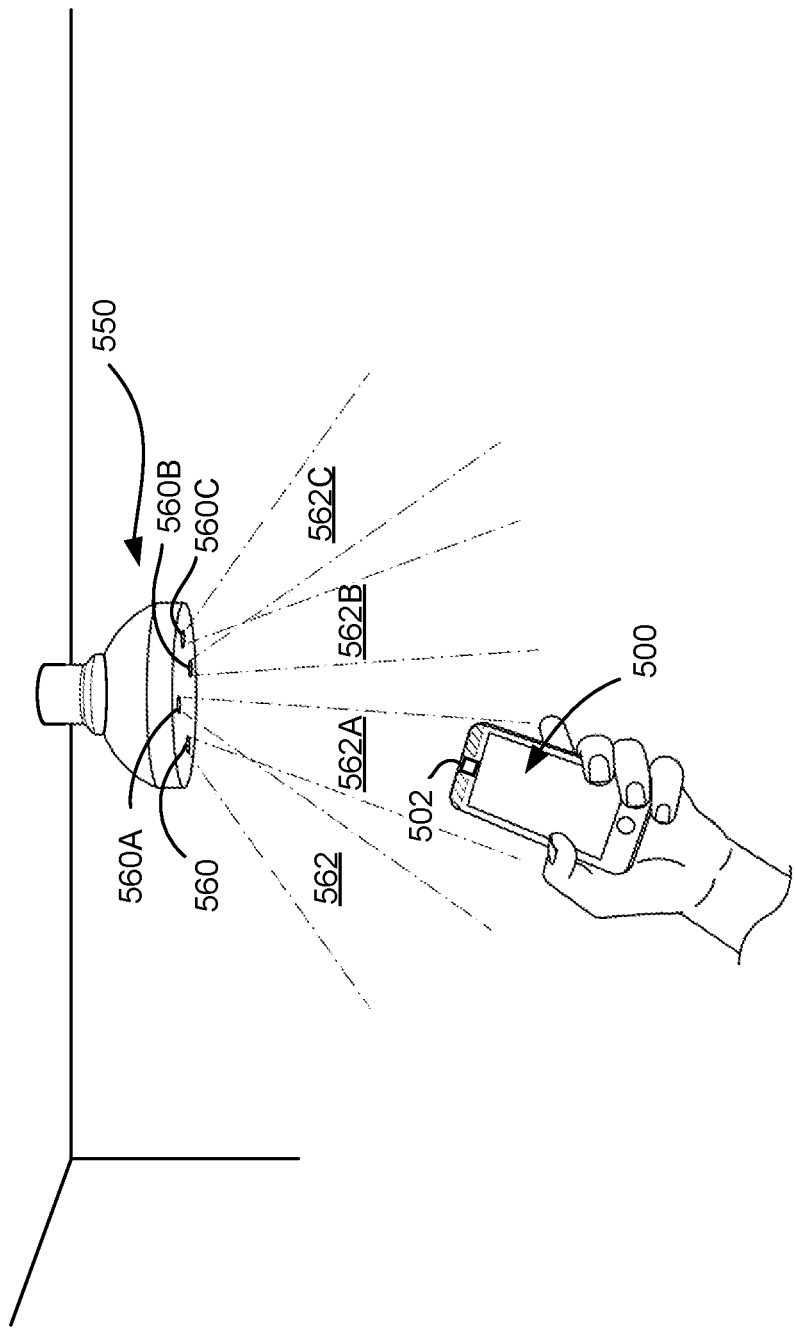
FIG. 5 is a schematic diagram of an example multimodal receiver device and multimodal power beam transmitter device.

FIG. 5 is a schematic diagram of an example multimodal receiver device 500 and multimodal power beam transmitter device 550.

The multimodal receiver device 500 may be similar to the receiver device 100 of FIG. 1, and thus, may include a power receiver, a power supply, and a modulating reflector. For further description of the above elements, description of the receiver device 100 of FIG. 1 may be referenced. However, the power receiver of the multimodal receiver device 500 further includes a multimodal power receiver 502 to receive different types of power beams 562. For example, the multimodal power receiver 502 may receive power from radio frequency signals, other electromagnetic (optical) signals such as infrared light beams, acoustic signals, or other power beams to charge its power supply.

The multimodal power beam transmitter device 550 may be similar to the power beam transmitter device 200 of FIG. 2, and thus, may include a power transmitter, a receiver array, a processor, a non-transitory computer-readable storage medium, and motion tracking instructions. For further description of the above elements, description of the power beam transmitter device 200 of FIG. 2 may be referenced. However, the multimodal power beam transmitter device 550 further includes a plurality of different power transmitters 560. For example, the multimodal power beam transmitter device 550 includes an optical power transmitter 560A which transmits an optical power beam 562A, a radio frequency power transmitter 560B which transmits a radio frequency power beam 562B, and an acoustic power transmitter 560C which transmits an acoustic power beam 562C.

Figure 6:
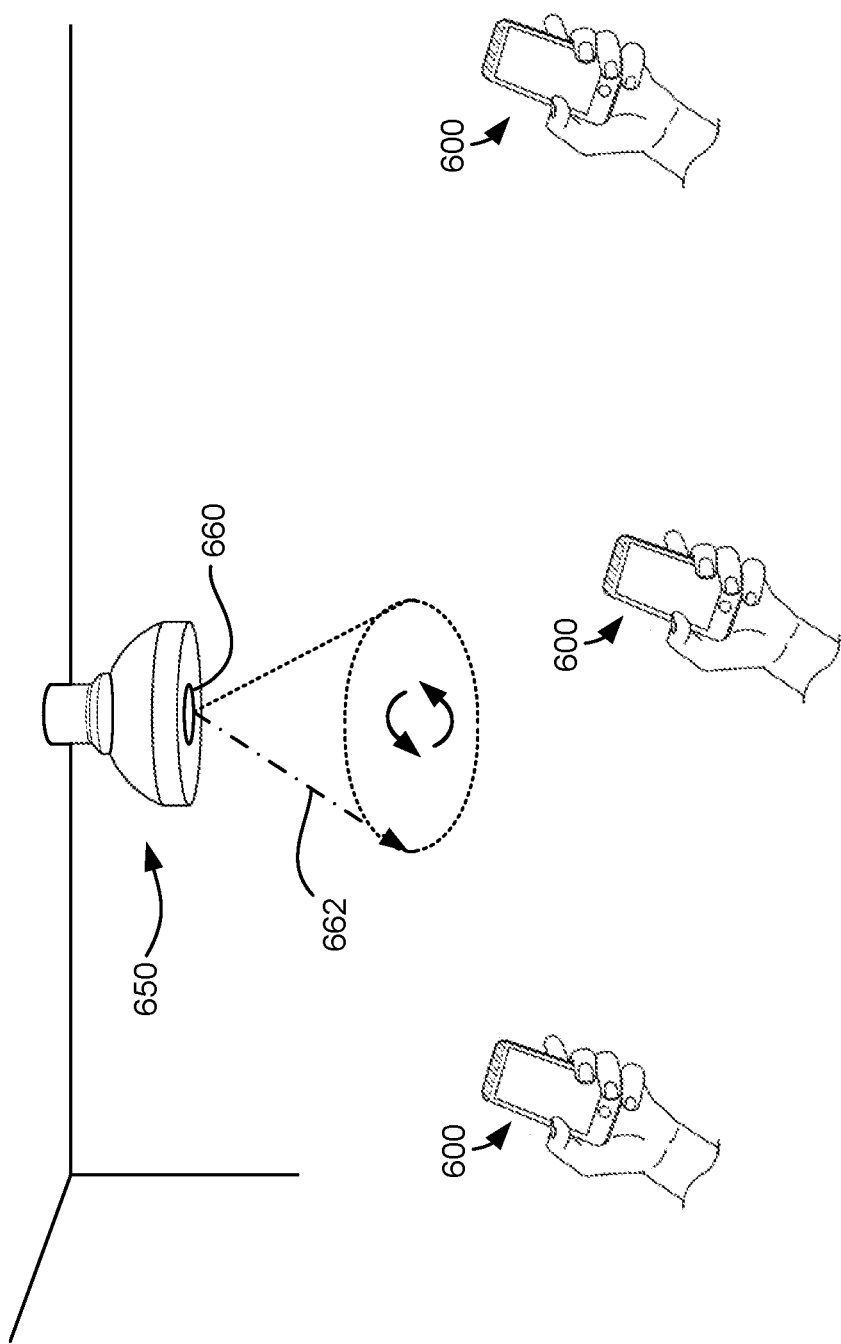
FIG. 6 is a schematic diagram of an example power beam transmitter device to scan an area for a power beam receiver device.

FIG. 6 is a schematic diagram of another example power beam transmitter device 650. The power beam transmitter device 650 may be similar to the power beam transmitter device 200 of FIG. 2, and thus, may include a power transmitter, a receiver array, a processor, a non-transitory computer-readable storage medium, and motion tracking instructions. For further description of the above elements, description of the power beam transmitter device 200 of FIG. 2 may be referenced. However, the power beam transmitter device 650 is further to vary a direction of a power beam 662 to scan an area for a power beam receiver device 600. For example, the power beam transmitter device 650 may include a power transmitter 660 which includes a micro electro-mechanical system (MEMS) to vary a direction of the power beam 662. The MEMS may include a micro-actuator to vary orientation of the power transmitter 660 to aim the power beam 662.

A power beam receiver device 600 may be similar to the receiver device 100 of FIG. 1, and thus, may include a power receiver, a power supply, and a modulating reflector. For further description of the above elements, description of the receiver device 100 of FIG. 1 may be referenced. When the power beam transmitter device 650 generates a power beam 662 and varies the direction of the power beam 662, the power beam 662 may strike a modulating reflector a power beam receiver device 600. The power beam receiver device 600 may reflect a portion of the power beam 662 back to the power beam transmitter device 650 as a reflected signal, and the reflected signal may include an indication of the magnitude of power received by the power beam receiver device 600 from the power beam 662. Thus, as the power beam transmitter device 600 scans an area, the power beam transmitter device 600 may receive several indications from different power beam receiver devices 600 indicating the magnitude of power received which may vary based on the different locations of the different power beam receiver devices 600. These indications may be used to determine which power beam receiver device 600 would receive the greatest amount of power from the power beam transmitter device 650 given the respective locations of the power beam receiver devices 600.

Figure 7:
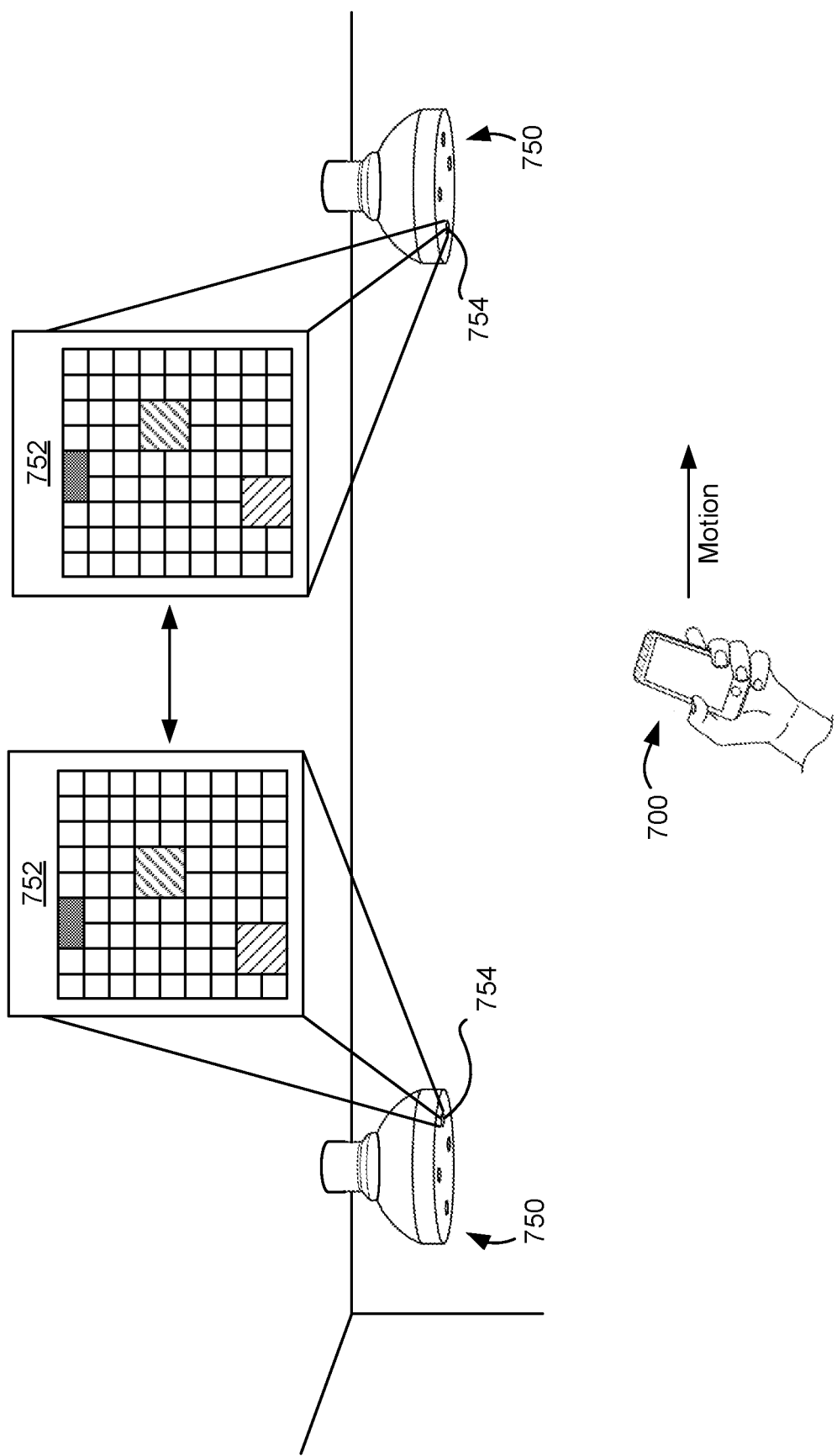
FIG. 7 is a schematic diagram of an example group of power beam transmitter devices to generate and compare a signal maps of an area including power beam receiver devices.

FIG. 7 is a schematic diagram of an example group of power beam transmitter devices 750. A power beam transmitter device 750 may be similar to the power beam transmitter device 200 of FIG. 2, and thus, may include a power transmitter, a receiver array, a processor, a non-transitory computer-readable storage medium, and motion tracking instructions. For further description of the above elements, description of the power beam transmitter device 200 of FIG. 2 may be referenced. However, a power beam transmitter device 750 is further to generate a signal map 752 of an area including a power beam receiver device 700 and to compare signal maps 752 generated by other power beam transmitter devices 750 to track motion of a power beam receiver device 700. A comparison of signal maps 752 may be used for angle-of-arrival calculations to track motion of the receiver device 700.

A power beam transmitter device 750 may include a heterodyne array 754 to receive reflected signals from power beam receiver devices 700 to generate the signal map 752. The heterodyne array 754 may receive differently modulated reflected signals from different power beam receiver devices 700. Different power beam transmitter devices 750 may compare the different signal maps 752 to track motion of a power beam receiver device 700. Further, a power beam transmitter device 750 may use the heterodyne array 754 to synchronize alignment of a power beam with a power beam receiver device 700.

Figure 8:
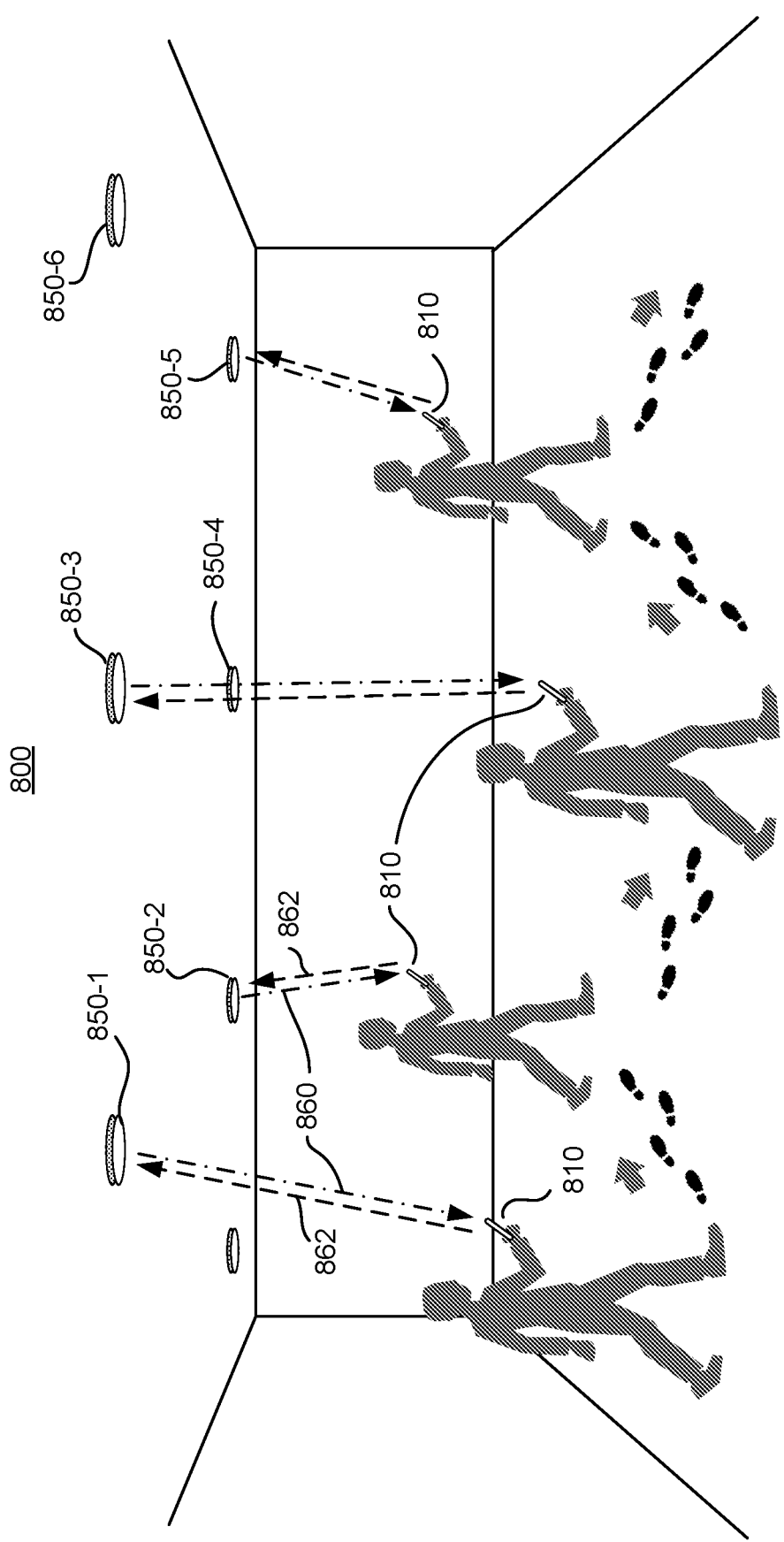
FIG. 8 is a schematic diagram showing an example system of a plurality of power beam transmitter devices to coordinate transmission of power beams to a receiver device.

FIG. 8 is a schematic diagram showing an example system 800 of a plurality of power beam transmitter devices 850 to coordinate transmission of power beams 860 to a receiver device 810. The system 800 may be similar to the system 300, and thus may include a plurality of power beam transmitter devices 850 to transmit power beams 860 to a receiver device 810 and to receive reflected signals 862 from the receiver device 810 to track motion of the receiver device 810 and to coordinate transmission of power beams 860. For further description of the power beam transmitter devices 850 and the receiver device 810, the description of system 300 of FIG. 3 may be referenced. In the system 800, the power beam transmitter devices 850-1, 850-2, 850-3, 850-4, 850-5, 850-6, are mounted to a ceiling of a room and are positioned to provide coverage to the room such that a receiver device 810 moving through the room may be charged at any position in the room from a power beam transmitter device 850. For example, as the receiver device 810 is moved through the room, the receiver device 810 is charged by the power beam transmitter device 850-1, followed by the power beam transmitter device 850-2, followed by the power beam transmitter device 850-3, followed by the power beam transmitter device 850-5. As the receiver device 810 moves, a first power beam transmitter device 850 may perform a hand-off procedure with a second power beam transmitter device 850 to handle the transition of charging to the next available power beam transmitter 850. For example, as the receiver device 810 moves further away from the power beam transmitter device 850-1, a reflected signal 862 to the power beam transmitter device 850-1 may indicate that the power being delivered to the receiver device 810 from the power beam transmitter device 850-1 is falling, and a reflected signal 862 to the power beam transmitter device 850-2 may indicate that the power that could be delivered to the receiver device 810 from the power beam transmitter device 850-2 is increasing. After a predetermined threshold is met, such as, for example, a determination that the power that could be delivered from the power beam transmitter device 850-2 is greater than the power that could be delivered from the power beam transmitter device 850-1, the power beam transmitter device 850-1 may hand off charging duty to the power beam transmitter device 850-2.

Figure 9:
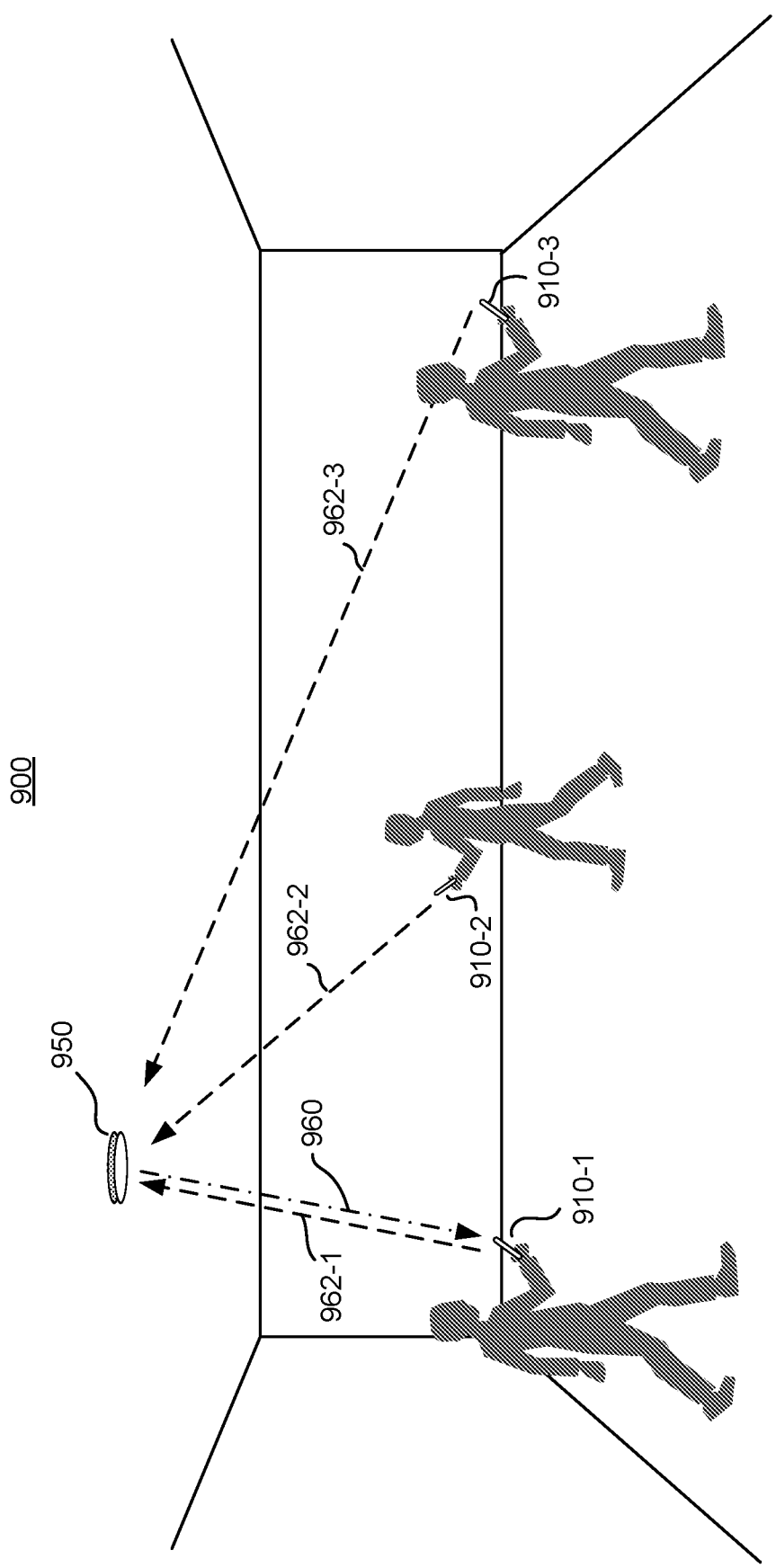
FIG. 9 is a schematic diagram showing an example system including a power beam transmitter device to coordinate transmission of power beams to a plurality of receiver devices.

FIG. 9 is a schematic diagram showing an example system 900 including a power beam transmitter device 950 to coordinate transmission of power beams 960 to a plurality of receiver devices 910. For further description of the power beam transmitter device 950 and the receiver devices 910, the description of system 300 of FIG. 3 may be referenced. The power beam transmitter device 950 prioritizes charging of the receiver devices 910 as discussed herein. For example, the power beam transmitter device 950 receives reflected signals 962-1, 962-2, and 962-3 from receiver devices 910-1, 910-2, 910-3, and transmits a power beam 960 to the receiver device 910-1 based on prioritization. The power beam transmitter device 950 may prioritize distribution of power to the plurality of receiver devices 910 as discussed herein.

Figure 10:
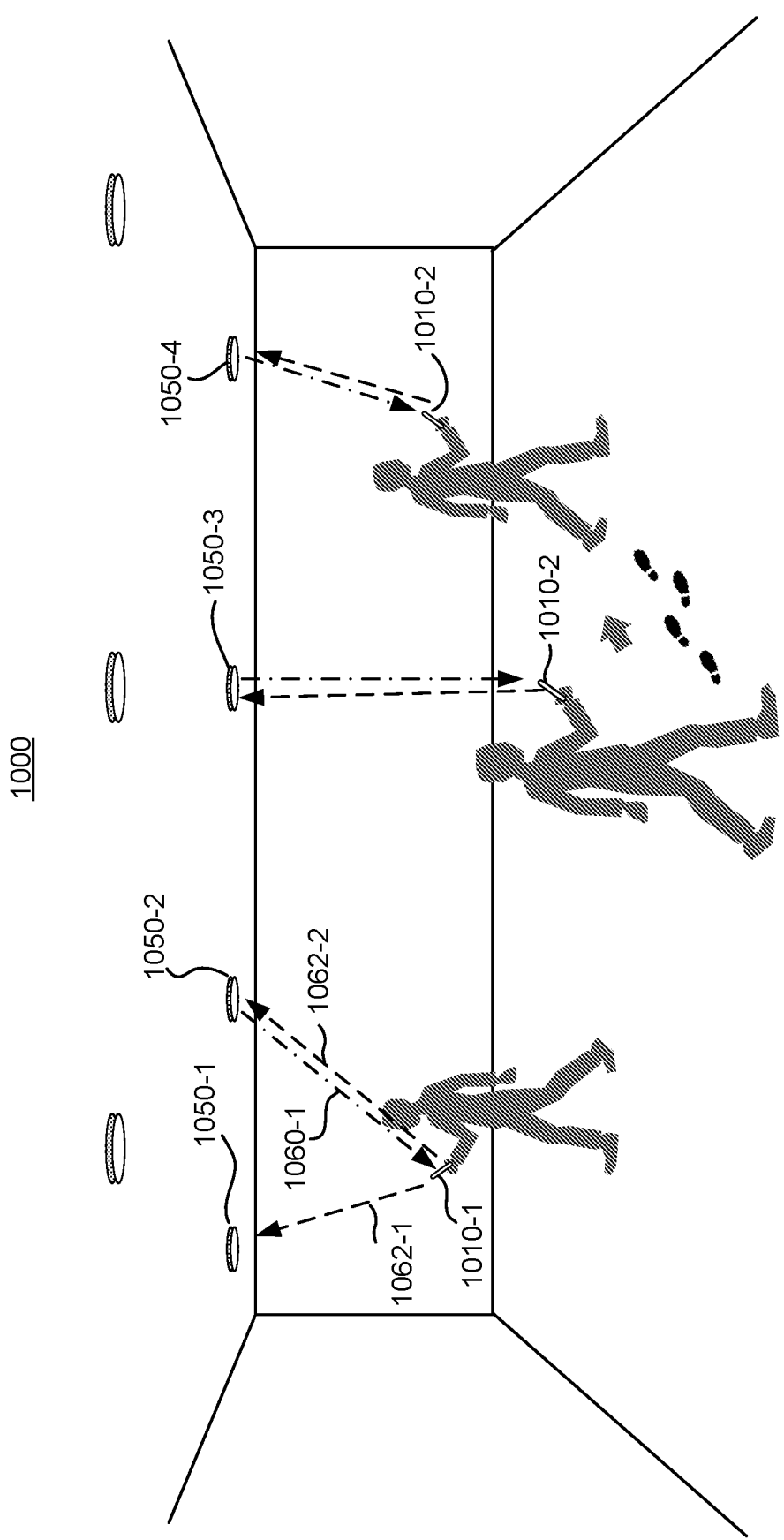
FIG. 10 is a schematic diagram showing an example system of a plurality of power beam transmitter devices to coordinate transmission of power beams to a plurality of receiver devices.

FIG. 10 is a schematic diagram showing an example system 1000 of a plurality of power beam transmitter devices 1050 to transmit power beams 1060 to a plurality of receiver devices 1010. For further description of the power beam transmitter devices 1050 and the receiver device 1010, the description of system 300 of FIG. 3 may be referenced. The power beam transmitter devices 1050 cooperate to prioritize charging of the receiver devices 1010 as discussed herein. For example, the receiver device 1010-1 reflects the reflected signal 1062-1 to the power beam transmitter device 1050-1 and reflects the reflected signal 1062-2 to the power beam transmitter device 1050-2, and the power beam transmitter devices 1050-1, 1050-2, cooperate to determine that the power beam transmitter device 1050-2 is assigned to charge the receiver device 1010-1, and thus the power beam transmitter device 1050-2 transmits a power beam 1060-1 to the receiver device 1010-1. As another example, the receiver device 1010-2 is charged by the power beam transmitter device 1050-3, followed by the power beam transmitter device 1050-4, as the receiver device 1010-2 is moved through an area.

Figure 11:
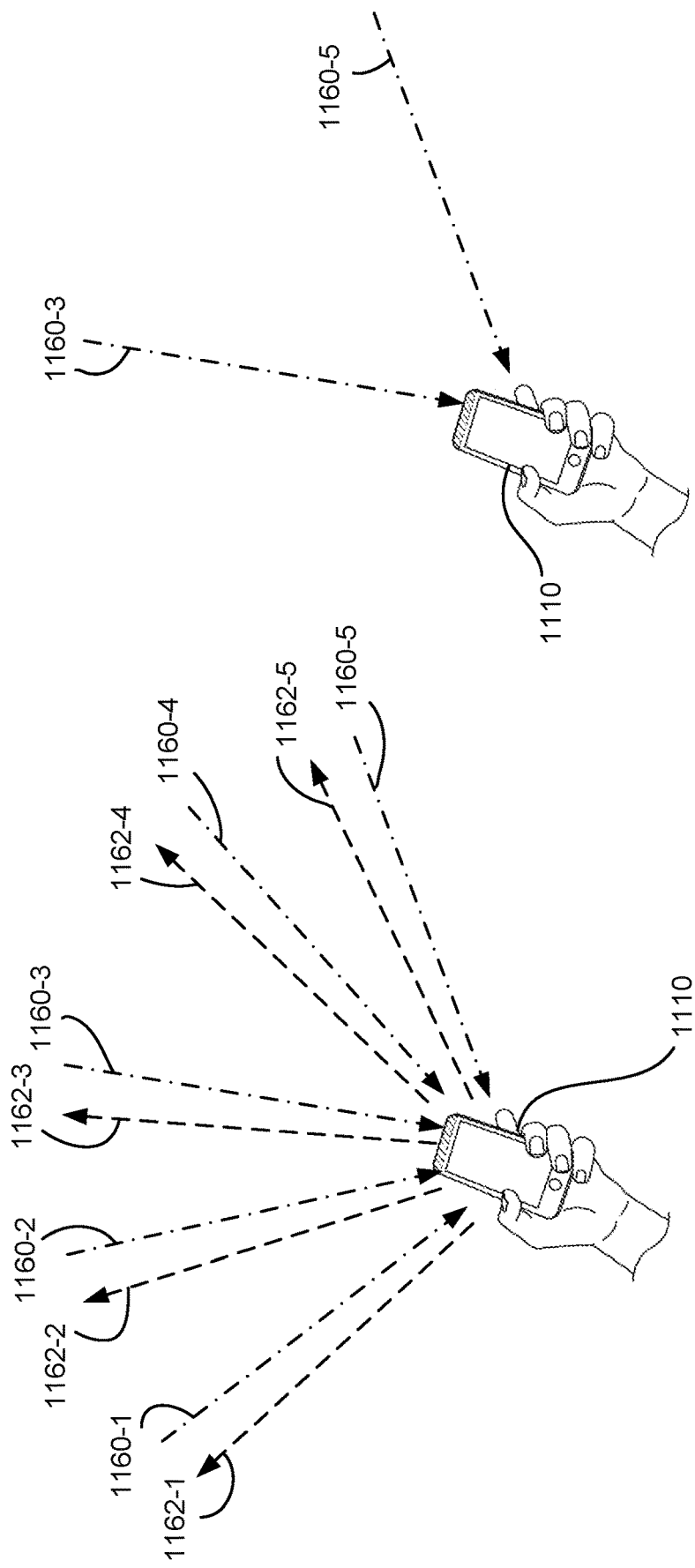
FIG. 11 is a schematic diagram showing an example receiver device receiving a plurality of power beams.

FIG. 11 is a schematic diagram showing an example receiver device 1110 receiving a plurality of power beams 1160. The receiver device 1110 may be similar to the receiver device 100 of FIG. 1, and thus, for further description of the receiver device 1110, description of the receiver device 100 of FIG. 1 may be referenced. The receiver device receives a plurality of power beams 1160 from power beam transmitter devices and reflects a plurality of reflected signals 1162 back to the power beam transmitter devices. The reflected signals 1162 are received by the power beam transmitter devices, which coordinate transmission of power beams 1160 to the receiver device 1110. Overlapping power beams 1160 may cause the power density in an area to exceed the threshold. Thus, the power beam transmitter devices may coordinate transmission of power beams 1160 to the receiver device based on maintaining power density in an area below a threshold to comply with legal, safety, or other regulations. For example, on the left hand side of FIG. 11, the receiver device 1110 receives the power beams 1160-1, 1160-2, 1160-3, 1160-4, 1160-5, and reflects reflected signals 1162-1, 1162-2, 1162-3, 1162-4, and 1162-5. Based on the reflected signals 1162, it may be determined by power beam transmitter devices that the power that would be delivered by all power beams 1160-1, 1160-2, 1160-3, 1160-4, and 1160-5 simultaneously may cause the power density in the area around the receiver device 1110 to exceed a legal, safety, or other regulatory threshold, and thus the power beam transmitters may coordinate to determine that the receiver device 1110 should be charged by only the power beams 1160-3 and 1160-5, as shown on the right hand side of FIG. 12, to maintain power density in the area below the threshold. The power beams 1160-3 and 116-5 coalesce at the receiver device 1110 and the power density in the air surrounding the receiver device 1110 is maintained below the safety threshold.

Figure 12:
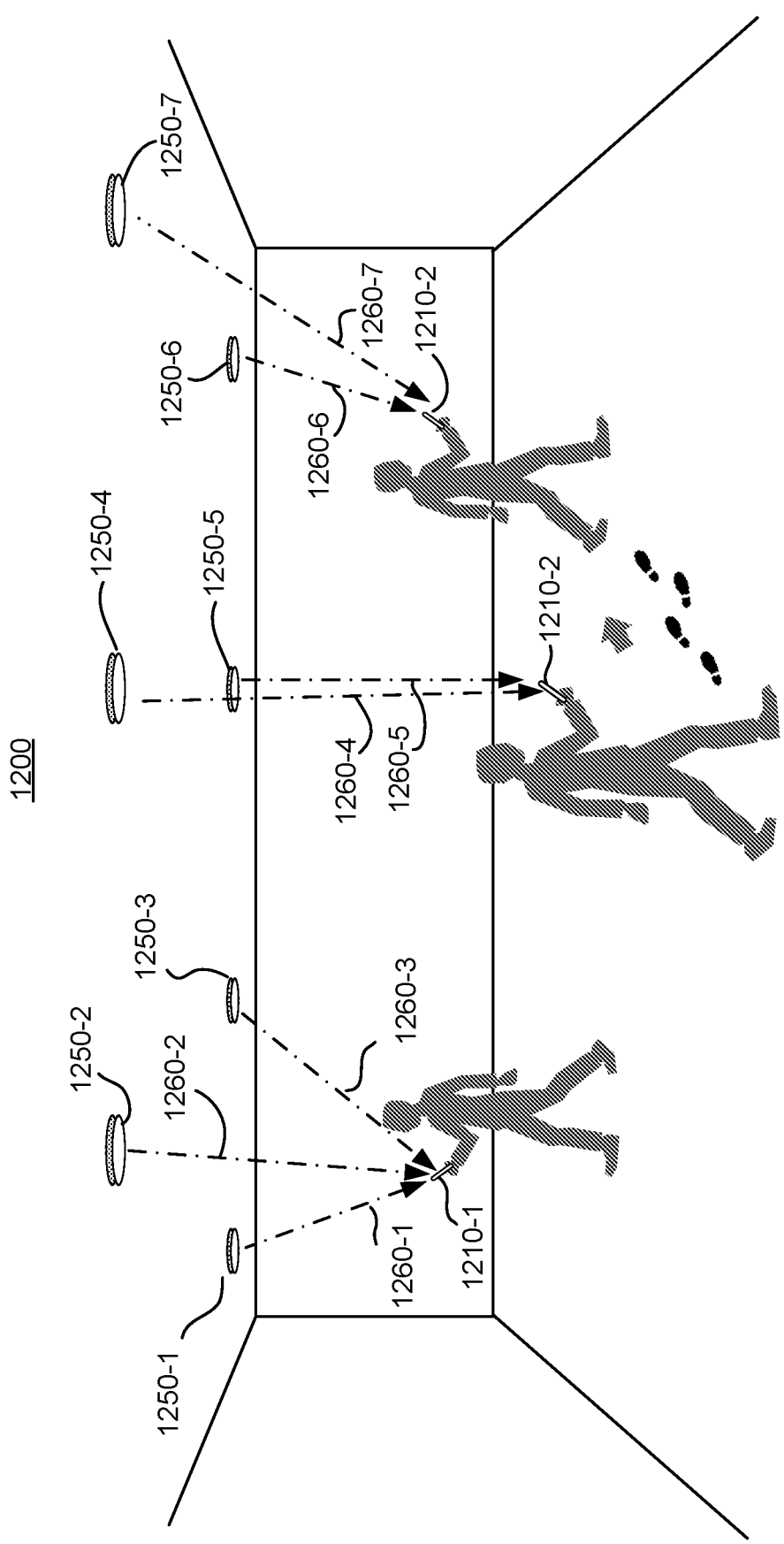
FIG. 12 is a schematic diagram showing an example system of a plurality of power beam transmitter devices to coordinate transmission of power beams to a plurality of receiver devices with individual receiver devices being charged by pluralities of power beam transmitter devices.

FIG. 12 is a schematic diagram showing an example system 1200 of a plurality of power beam transmitter devices 1250 to coordinate transmission of power beams 1260 to a plurality of receiver devices 1210. For further description of the power beam transmitter devices 1250 and receiver devices 1210, the description of system 300 of FIG. 3 may be referenced. The power beam transmitter devices 1250 cooperate to prioritize charging of the receiver devices 1210 as discussed herein. Further, individual receiver devices 1210 may be charged by pluralities of power beam transmitter devices 1250. For example, the receiver device 1210-1 is charged by the power beam transmitter devices 1250-1, 1250-2, and 1250-3, via power beams 1260-1, 1260-2, and 1260-3. As another example, the receiver device 1210-2 is charged by the power beam transmitter devices 1250-4 and 1250-5 at a first location via power beams 1260-4 and 1260-5, and is later charged by power beam transmitter devices 1250-6 and 1250-7 at a second location via power beams 1260-6 and 1260-7.

Thus, a device in motion, or a group of devices in motion, may be wirelessly charged by a power beam transmitter device or a group of power beam transmitter devices. A device may receive a power beam and modulate and reflect a portion of the power beam to a power beam transmitter device so that the power beam transmitter device may track motion of the device. The power beam transmitter device may use the reflected signal in an angle-of-arrival calculation, a time-of-flight calculation, or for the generation of a signal map, to track motion of the receiver device. A group of power beam transmitter devices may coordinate transmission of power beams to the receiver device based on the motion of the receiver device. The power beam transmitter devices may use a multitude of power transmitters to provide multimodal charging to the device in motion.

Users of mobile devices can thereby conveniently traverse an area with the device while the device is wirelessly charged from a distance. Further, power density in an area may be maintained below a safety threshold by a power beam transmitter device coordination transmission of different types of power beams or by coordinating transmission of power beams with other power beam transmitter devices.

The scope of the claims should not be limited by the above examples, but should be given the broadest interpretation consistent with the description as a whole.

The invention claimed is:

1. A receiver device comprising:
    a power receiver to receive a power beam to charge a power supply; and
    a modulating reflector to reflect a portion of the power beam as a reflected signal, modulate the reflected signal, and vary a direction of the reflected signal to scan an area for a power beam transmitter device, wherein the power beam transmitter device is to track motion of the receiver device based on modulation of the reflected signal and to cooperate with other power beam transmitter devices to prioritize distribution of power among a plurality of receiver devices.

2. The receiver device of claim 1, wherein the modulating reflector is to reflect the reflected signal to the power beam transmitter device for use in an angle-of-arrival calculation to track motion of the receiver device.

3. The receiver device of claim 1, wherein the modulating reflector is to reflect the reflected signal to the power beam transmitter device for use in a time-of-flight calculation to track motion of the receiver device.

4. The receiver device of claim 1, wherein the receiver device is to transmit to the power beam transmitter device an indication of a power level of the receiver device, and wherein the power beam transmitter device is to cooperate with the other power beam transmitter devices to prioritize distribution of power among the plurality of receiver devices based on the power level of the receiver device and other power levels of other receiver devices of the plurality of receiver devices.

5. The receiver device of claim 1, wherein the power receiver includes a multimodal power receiver to receive different types of power beams.

6. The receiver device of claim 1, wherein the reflected signal has a magnitude to indicate to the power beam transmitter device a magnitude of power received by the receiver device from the power beam, and wherein the power beam transmitter device is to cooperate with the other power beam transmitter devices to prioritize distribution of power among the plurality of receiver devices based on the magnitude of power received by the receiver device and other magnitudes of power received by other receiver devices of the plurality of receiver devices.

7. The receiver device of claim 1, wherein the modulating reflector includes a micro electro-mechanical system (MEMS) to vary the direction of the reflected signal.

8. A power beam transmitter device comprising:
    a power transmitter to transmit a power beam;
    a receiver array to receive a reflected signal from a power beam receiver device; and
    a processor connected to the receiver array to determine a modulation of the reflected signal, to track motion of the power beam receiver device based on the modulation of the reflected signal and to cooperate with other power beam transmitter devices to prioritize distribution of power among a plurality of power beam receiver devices,
    wherein the plurality of power beam receiver devices are located in an area, and the processor is to generate a signal map of the area based on differently modulated reflected signals from different power beam receiver devices and compare signal maps generated by the other power beam transmitter devices to track motion of the plurality of power beam receiver devices.

9. The power beam transmitter device of claim 8, wherein the power transmitter is to vary a direction of the power beam to scan an area for the power beam receiver device.

10. The power beam transmitter device of claim 8, wherein the receiver array includes a heterodyne array to receive the differently modulated reflected signals from the different power beam receiver devices.

11. A system for wireless charging of devices in motion, the system comprising:
   a plurality of power beam transmitter devices; and
   a receiver device, the receiver device including a modulating reflector to reflect a portion of a power beam as a reflected signal to a receiving power beam transmitter device of the plurality of power beam transmitter devices, wherein the receiver device varies a direction of the reflected signal to scan an area for a power beam transmitter device, the plurality of power beam transmitter devices to track motion of the receiver device based on modulation of the reflected signal and to coordinate transmission of power beams to the receiver device to prioritize charging of the receiver device among a plurality of receiver devices.

12. The system of claim 11, wherein the reflected signal has a magnitude to indicate to the receiving power beam transmitter device a magnitude of power received by the receiver device from the power beam, and the plurality of power beam transmitter devices is to coordinate transmission of power beams to the receiver device further based on the magnitude of power received from the power beam.

13. The system of claim 11, wherein the plurality of power beam transmitter devices is to coordinate transmission of power beams to receiver devices further based on maintaining power density in an area surrounding the receiver device below a threshold.

14. The system of claim 11, wherein a first and second power beam transmitter device of the plurality of power beam transmitter devices is to transmit different types of power beams to the receiver device.

* * * * *